3,461,504
FABRIC-FORMING APPARATUS
Marvin Becker, 276 Newtown Turnpike, Wilton, Conn.
06897, and Harold Belmuth, 8 Highwood Lane, Westport, Conn. 06880
Filed Nov. 30, 1967, Ser. No. 686,907
Int. Cl. B29c *3/00, 17/50*
U.S. Cl. 18—19                                                  6 Claims

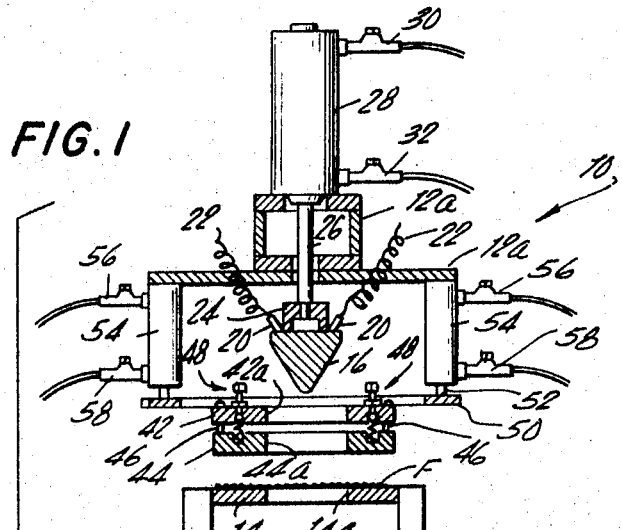
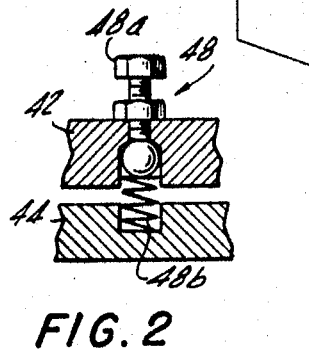
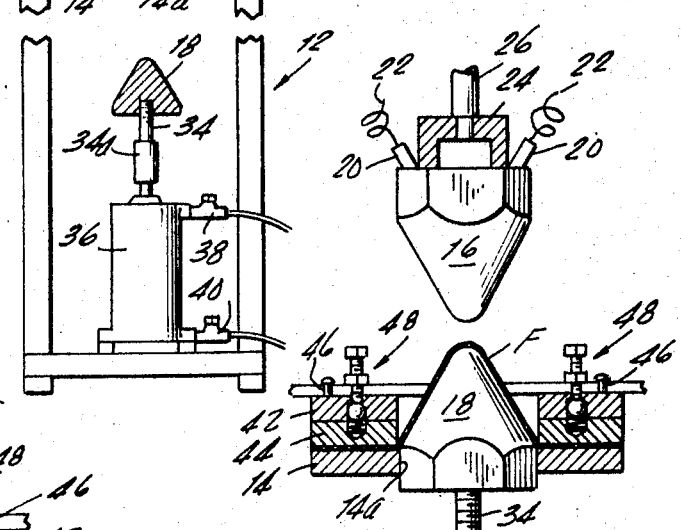
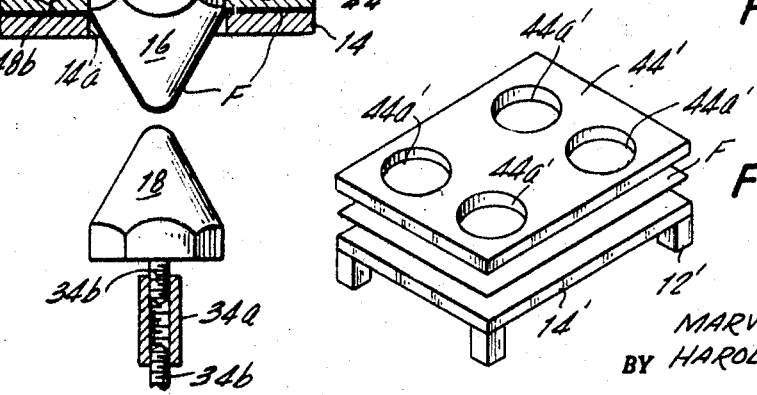
FIG. 1
FIG. 2
FIG. 3
FIG. 4
FIG. 5
INVENTORS
MARVIN BECKER
HAROLD BELMUTH
BY Amster & Rothstein
ATTORNEYS United States Patent Office 3,461,504
Patented Aug. 19, 1969

ABSTRACT OF THE DISCLOSURE

Apparatus for forming three-dimensional shapes in a fabric having a plastic content using two cooperating die members, one to shape the fabric and the other to support the shaped fabric during cooling to thereby minimize fabric distortion and shrinkage.

---

The present invention relaets generally to improvements in fabric-forming apparatus and more particularly to such improved apparatus capable of producing shaped fabric to exact sizes and configurations.

It is already well known that fabric having an appropriately significant plastic content can be molded or formed into three-dimensional shapes in preparation for uses as brassiere cups or like products. The molding or forming apparatus now available to achieve this shaping is not entirely satisfactory, particularly insofar as producing shaped fabric parts to precise sizes and configurations.

Broadly, it is an object of the present invention to provide an improved fabric-forming apparatus overcoming the foregoing and other shortcomings of the prior art. Specifically, it is an object to provide fabric molding apparatus in the operation of which a permanent three-dimensional shape is imparted to the fabric while in a supported condition to thereby minimize fabric distortion and shrinkage and enable the production of shaped fabric in precise sizes and configurations.

Fabric-forming apparatus demonstrating objects and advantages of the present invention includes at least one set of cooperating die members operatively movable, in sequence, from opposite directions through the initial plane of the fabric. The first die member moved generates sufficient heat to soften the plastic fabric and is effective during movement against the fabric to project the same into a three-dimensional shape. Thereafter the shaped fabric is stripped from this die member and transferred to the other similarly shaped die member and permitted to cool thereon, so that while being permanently imparted with its molded shape the fabric is held to shape and size.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a simplified front elevational view, in section, of a fabric-forming apparatus according to the present invention;

FIG. 2 is a partial elevational view on an enlarged scale of an exemplary means of adjusting the holding pressure of fabric-holding plates of the apparatus hereof;

FIGS. 3 and 4 are partial sectioned elevational views illustrating a typical fabric-forming operation, namely, to wit:

FIG. 3 illustrates the upper heating die member of the apparatus in its operative position with respect to the fabric which produces a three-dimensional shape in the fabric;

FIG. 4 illustrates the lower cooling die member of the apparatus in its operative position supporting the shaped fabric during cooling thereof; and FIG. 5 is a partial perspective view of a second embodiment of fabric-holding plates appropriate for the fabric-forming apparatus hereof.

Reference is now made to the drawings, and in particularly to the first embodiment of FIGS. 1–4, wherein there is shown a fabric-forming apparatus, generally designated 10, demonstrating objects and advantages of the present invention. As is generally known, a wide range of fabrics F having a plastic content, such as polyester or similar yarns, can advantageously be shaped into three-dimensional configurations suitable for use as brassiere cups or like products. Also generally known are several types or models of apparatus with which to achieve this shaping of the fabric F, but such apparatus is generally not effective in producing shaped fabric in exact sizes and configurations.

The illustrated apparatus 10 hereof has been simplified by the omission of structural features which are well known in the art and which are not necessary for an understanding of the present invention. Apparatus 10 includes a conventional base or frame 12 supporting a horizontally oriented table 14. Frame 12 additionally appropriately supports the two significant operating elements of the apparatus 10, namely an upper heating die member 16 and a lower cooling die member 18. It will be understood that the position of the die members 16, 18 can be reversed and their number increased and other aspects thereof varied without departing from the present invention. It is suffice that of the die members 16, 18 one of these members generates sufficient heat to render the fabric F moldable so that this die member, in the manner which will subsequently be described, is effective in projecting the heated fabric F into a three-dimensional shaped configuration; that the other die member have a substantially identical shape and serve as a support for the shaped fabric during cooling thereof; and that the two die members are arranged in confronting relationship, with either in the upper or lower position, and are each movable through the plane of the fabric.

More particularly, in the illustrated apparatus 10 the upper die member 16, in an appropriately substantially conical shape, is the heating die member equipped with conventional heating coils 20 electrically energized through conductors 22. The die member 16 is appropriately fixedly mounted, as at 24, to the free end of a piston rod 26 of a powering air cylinder 28 having valves 30, 32 controlling the introduction and exhausting of pressure air to produce, in a well understood manner, vertical reciprocating movement of the piston rod 26. Upper die member 16 and its powering air cylinder 28 are appropriately mounted on upper support structure 12a which, although not specifically shown, is part of the frame 12.

The other die member 18 which is not equipped to generate heat occupies a lower position from which it is movable through a powering stroke along the same path of movement as the upper die member 16, but of course in the opposite direction. The cooling die member 18 has the same conical shape and is similarly mounted on a piston rod 34 of a powering air cylinder 36 operated by pressure air introduced and exhausted through valves 38, 40. Adjustment in the position of the member 18 is advantageously achieved by threaded adjustment of the sleeve 34a engaged with the threaded sections 34b, all as best shown in FIG. 3.

Completing the construction of the apparatus 10 is a fabric work station located between the die members 16, 18. This work station includes the previously noted table 14 having a medial opening 14a therein equal in size to the diameter of the base of the die members 16, 18. Cooperating with the table 14 is an upper movable arrangement of fabric-holding plates 42, 44 which, in practice, engage fabric F previously placed in an operative position on the upper surface of the table 14. In the exemplary embodiment illustrated herein, the lower plate 44 is slidably movable on depending bolts 46 against the urgency of opposing spring arrangements 48, shown in detail in FIG. 2. Depending upon the threaded adjustment of the threaded element 48a, the helical spring 48b is placed under a corresponding state of compression and, in turn, regulates the firmness with which the bottom fabric-holding plate 44 is pressed against the peripheral edge of the fabric F. The significance of this will subsequently be more apparent.

Both the plates 42, 44 have aligned medial openings 42a, 44a of the same size as the medial opening 14a of the plate 14 and both are also aligned with the opening 14a. The upper plate 42 is straddled across a frame 50 which on each opposite side is connected to the face end of a piston rod 52 of a powering air cylinder 54 operated by pressure air controlled by valves 56, 58.

The operation of the apparatus 10 will now be described with particular reference to FIGS. 3 and 4 which illustrate the two-step molding operation of the present invention. As may be best understood from FIG. 3, a typical molding cycle is initiated by the operation of the air cylinders 54 which close the fabric-holding plates 42, 44 against a plastic fabric F in position upon the table 14. Next, the upper heated die member 16 is actuated from its clearance position, as illustrated in FIG. 1, through a fabric-forming stroke in which it is projected through the aligned openings 42a, 44a and 14a and beyond the initial horizontal plane of the fabric into the operative position of FIG. 3. During this fabric-forming stroke, the heat generated within the die member 16 is transferred to and causes the fabric F to assume a soft plastic state in which, as generally understood, the plastic fabric F is readily moldable. During this initial stage of heating the fabric F and before it has fully reached a desirable moldable state, a portion of the fabric F surrounding the opening 14a is drawn by the movement of the die member 16 into the opening 14a which facilitates the subsequent stretching of the moldable fabric F into the desired three-dimensional shape. The extent to which such an additional portion of the fabric F is fed or payed out into the opening 14a is a function of the firmness with which the fabric F is held between the plates 14 and 44 and, as previously noted, this in turn is a function of the urgency produced by the spring biasing arrangements 48.

At the termination of the fabric-forming stroke of the upper die member 16, the heated fabric F is appropriately stretched about the three-dimensional conical shape of the die member 16, all as is clearly shown in FIG. 3.

The next significant step is the withdrawal of the upper die member 16 back to its clearance position of FIG. 1 simultaneously with the movement of the lower die member 18 through its fabric-forming stroke. As best shown in FIG. 4, the result of this simultaneous die movement is that the fabric F is effectively stripped from the die member 16 and positioned in an exact mirror image of its molded shape on the die member 16 upon the unheated die member 18. While the fabric F is in this supported position up the die member 18 it is permitted to cool and thus permanently assume the three-dimensional conical shape. The cooling of the fabric F in this supported position has been found to minimize distortion and shrinkage in fabric F which heretofore prevented molding three-dimensional shapes in plastic fabrics to precise size and shape requirements.

After cooling of the fabric F, the lower die member 18 and the fabric-holding plates 42, 44 are moved to their respective clearance positions releasing the molded fabric F.

From the aforesaid it should be readily appreciated that the production of the apparatus 10 can be increased by correspondingly increasing the number of fabric-forming operations simultaneously taking place. This, in turn, entails merely employing several sets of cooperating upper and lower die members 16, 18, each set of which is effective, during the operation of the apparatus 10, of producing a three-dimensional shape in the fabric F. This plural arrangement of cooperating upper and lower die members would, of course, necessitate corresponding modification in the fabric-holding apparatus.

An appropriately modified fabric-holding apparatus is diagrammatically illustrated in FIG. 5 wherein parts similar to parts already described are designated by the same but primed reference numerals. For brevity's sake only the lower plate 44' of the two-fabric-holding plates are shown, this plate having four operative openings 44a' which each are in the path of movement of a cooperating set of upper and lower die members. The fabric F' is interposed between the plate 44' and the work table 14' and four three-dimensional shapes are formed simultaneously in the fabric F' during operation of the cooperating upper and lower die members.

In addition to such changes and modifications as just indicated, it will be understood that a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A fabric-forming apparatus comprising a fabric-holding means operatively arranged to peripherally engage a fabric having a plastic content preparatory to providing a three-dimensional shape to said fabric, at least one heating die member of a prescribed three-dimensional shape operatively arranged for movement through a fabric-forming stroke in one direction of movement from a clearance position against said fabric so as to form said three-dimensional shape in said fabric, and at least one cooling die member also of said prescribed three-dimensional shape operatively arranged in confronting relation to said heating die member for movement through a fabric-forming stroke but in said opposite direction of movement from a clearance position against said fabric so as to receive thereon said shaped fabric which is stripped from said heating die member, whereby the shaping of said fabric is completed while said fabric is supported on said cooling die member to minimize any size or shape distortion therein.

2. A fabric-forming apparatus as defined in claim 1 including means for withdrawing said heating die member to the clearance position thereof while simultaneously actuating said cooling die member through said fabric-forming stroke thereof to thereby cause the transfer of said shaped fabric from said heating die member to said cooling die member.

3. A fabric-forming apparatus as defined in claim 2 wherein said die members are operatively arranged for vertical reciprocating movement.

4. A fabric-forming apparatus as defined in claim 3 wherein said fabric-holding means includes a stationary and movable pair of holding plates adapted to engage the fabric therebetween and means for varying the firmness of said engagement of said movable plate so as to permit selective pay out of said fabric during the fabric-forming stroke of said heating die member.

5. A fabric-forming apparatus comprising means for holding a fabric having a plastic content in an initial horizontal operative position, at least one heating die member of a prescribed three-dimensional shape operatively arranged for vertical movement through a fabric-forming stroke in one direction of movement from a clearance position against said fabric so as to stretch said fabric into a three-dimensional shape conforming to said three-dimensional shape of said heating die member, at least one cooling die member also of said prescribed three-dimensional shape operatively arranged in confronting relation to said heating die member for vertical movement through a fabric-forming stroke but in said opposite direction of movement from a clearance position against said fabric for a prescribed extent beyond the plane of said fabric initial horizontal operative position, and powering means operatively connected to cause withdrawing movement of said heating die member back to said clearance position thereof simultaneously with said fabric-forming stroke of said cooling die member such that said shaped fabric is stripped from said heating die member and transferred to said cooling die member, whereby the shaping of said fabric is completed while said fabric is supported on said cooling die member to minimize any size and shape distortion therein.

6. A fabric-forming apparatus as defined in claim 5 wherein said means for holding a fabric includes a plate adapted to peripherally engage fabric and adjustable spring means for varying the firmness of said engagement of said plate so as to permit selective pay out of said fabric during the fabric-forming stroke of said heating die member.

References Cited
UNITED STATES PATENTS

| | | |
|---|---|---|
| 2,952,875 | 9/1960 | Herrick. |
| 3,004,288 | 10/1961 | Gardner. |
| 3,112,520 | 12/1963 | George et al. |

WILLIAM J. STEPHENSON, Primary Examiner

U.S. Cl. X.R.

264—322; 327